(12) United States Patent
Tamura et al.

(10) Patent No.: US 12,546,018 B2
(45) Date of Patent: Feb. 10, 2026

(54) AMMONIA MANUFACTURING APPARATUS AND AMMONIA MANUFACTURING METHOD

(71) Applicant: KABUSHIKI KAISHA TOSHIBA, Tokyo (JP)

(72) Inventors: Jun Tamura, Tokyo (JP); Satoshi Mikoshiba, Yamato Kanagawa (JP); Ryota Kitagawa, Tokyo (JP); Yoshitsune Sugano, Kawasaki Kanagawa (JP); Koji Mizuguchi, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1196 days.

(21) Appl. No.: 17/466,618

(22) Filed: Sep. 3, 2021

(65) Prior Publication Data

US 2021/0395902 A1 Dec. 23, 2021

Related U.S. Application Data

(63) Continuation of application No. PCT/JP2020/033321, filed on Sep. 2, 2020.

(30) Foreign Application Priority Data

Dec. 17, 2019 (JP) .................. 2019-227271

(51) Int. Cl.
*C25B 1/27* (2021.01)
*B01J 23/28* (2006.01)
(Continued)

(52) U.S. Cl.
CPC .................. *C25B 1/27* (2021.01); *B01J 23/28* (2013.01); *C01C 1/0411* (2013.01);
(Continued)

(58) Field of Classification Search
CPC ........... C25B 1/27; C25B 15/083; C25B 9/77; C25B 15/087; B01J 23/28
See application file for complete search history.

(56) References Cited

U.S. PATENT DOCUMENTS 8,916,123 B2 12/2014 Joshi et al.
2019/0040535 A1* 2/2019 MacFarlane ............ C25B 11/02
2019/0202707 A1* 7/2019 Colon ........................ C25B 1/04

FOREIGN PATENT DOCUMENTS

WO  WO 2016/172760 A1  11/2016
WO  WO-2019018875 A1 *  1/2019  ........... C01C 1/0405
WO  WO-2019168093 A1 *  9/2019  ............... C01C 1/04

OTHER PUBLICATIONS

Machine translated WO 2019168093 A1 (Year: 2019).*
(Continued)

*Primary Examiner* — Brian W Cohen
*Assistant Examiner* — Abelline Katusiime Fionah
(74) *Attorney, Agent, or Firm* — Finnegan, Henderson, Farabow, Garrett & Dunner, LLP

(57) ABSTRACT

An ammonia manufacturing apparatus includes: an electrochemical reaction unit including a first electrolytic bath for accommodating a first electrolytic solution, an oxidation electrode disposed in the first electrolytic bath, a second electrolytic bath for accommodating a second electrolytic solution containing nitrogen, an ammonia producing catalyst, and a reducing agent, a reduction electrode disposed in the second electrolytic bath, and a diaphragm, and configured to reduce nitrogen by the ammonia producing catalyst and the reducing agent in the second electrolytic bath to produce ammonia, and reduce the reducing agent oxidized due to the production of ammonia, at the reduction electrode by connecting the oxidation electrode and the reduction electrode to a power supply; a nitrogen supply unit including a nitrogen supply part for dissolving nitrogen in the second (Continued)

electrolytic solution; and an ammonia separation unit including a separation part configured to separate ammonia from the second electrolytic solution.

6 Claims, 4 Drawing Sheets

(51) Int. Cl.
*C01C 1/04* (2006.01)
*C25B 9/77* (2021.01)
*C25B 15/08* (2006.01)

(52) U.S. Cl.
CPC .......... *C01C 1/0417* (2013.01); *C01C 1/0458* (2013.01); *C25B 9/77* (2021.01); *C25B 15/083* (2021.01); *C25B 15/087* (2021.01)

(56) References Cited

OTHER PUBLICATIONS

European Patent Office, Supplementary European Search Report for Application 20903770.4, 8 pages (Sep. 23, 2024).
Hiromasa Tanaka et al., "Interplay between Theory and Experiment for Ammonia Synthesis Catalyzed by Transition Metal Complexes," Accounts of Chemical Research, vol. 49, pp. 987-995, DOI: 10.1021/acs.accounts.6b00033 (2016).
Aya Eizawa, et al., "Remarkable catalytic activity of dinitrogen-bridged dimolybdenum complexes bearing NHC-based PCP-pincer ligands toward nitrogen fixation," Nature Communications, 8:14874, DOI: 10.1038/ncomms14874, 12 pages (2017).
Yua Ashida, et al., "Molybdenum-catalysed ammonia production with samarium diiodide and alcohols or water," Nature, vol. 568, pp. 536-540, 16 pages (2019).

* cited by examiner

AMMONIA MANUFACTURING APPARATUS AND AMMONIA MANUFACTURING METHOD

CROSS-REFERENCE TO RELATED APPLICATION

This application is a continuation of prior International Application No. PCT/JP2020/033321, filed on Sep. 2, 2020 which is based upon and claims the benefit of priority from Japanese Patent Application No. 2019-227271, filed on Dec. 17, 2019; the entire contents of all of which are incorporated herein by reference.

FIELD

Embodiments disclosed herein relate to an ammonia manufacturing apparatus and an ammonia manufacturing method.

BACKGROUND

The amount of production of ammonia is about 140 million tons in the world in a year and continues to rise. 80% of the amount of production is utilized as a raw material for fertilizer, and is mainly converted to other nitrogen compounds such as urea, nitric acid, ammonium nitrate, and ammonium sulfate. On the other hand, the remaining 20% thereof is utilized for manufacture of synthetic resin and fiber. In order to cope with the global population growth, the shortage of cultivated acreage, and the food shortages due to the sophistication of diet mainly in developing countries, an increase of demand for ammonia is inevitable. Ammonia attracts attention when used as an energy carrier owing to ease of handling, high in energy density, and a characteristic of containing no carbon and emitting no carbon dioxide when used.

At present, ammonia is industrially synthesized from a hydrogen gas and a nitrogen gas derived from a fossil fuel such as petroleum, coal, or natural gas by the method called Haber-Bosh process invented about 100 years ago. This synthesis reaction requires severe conditions such as high temperature (400 to 650 degrees) and high pressure (200 to 400 atm), and consumes 1.2% of total energy in the world and emits a large amount of carbon dioxide. In order to form a sustainable society in the future, the development of an alternative synthesis process for ammonia with low dependence on the fossil fuel is expected.

Regarding the above point, a catalyst for producing ammonia from nitrogen at normal temperature and pressure is under development. For example, it has been reported that a solution containing a molybdenum iodide complex having a PNP ligand (PNP is 2,6-bis(di-tert-butylphosphinomethyl)pyridine) as catalyst, alcohol or water as a proton source, and a halide (II) of a lanthanoide metal, for example, samarium (II) iodide as a reducing agent are stirred in the presence of nitrogen gas at normal temperature to thereby produce up to 4350 equivalents of ammonia per catalyst. However, the production reaction of ammonia needs to use a stoichiometric amount of expensive samarium (II) iodide for the reducing agent. Further, the reaction can be controlled only within the amount of the reducing agent. Thus, the development of the ammonia manufacturing method capable of controlling the reaction at lower cost is expected from the industrial aspect.

DETAILED DESCRIPTION

An ammonia manufacturing apparatus of an embodiment includes: an electrochemical reaction unit including a first electrolytic bath for accommodating a first electrolytic solution, an oxidation electrode disposed in the first electrolytic bath, a second electrolytic bath for accommodating a second electrolytic solution containing nitrogen, an ammonia producing catalyst, and a reducing agent, a reduction electrode disposed in the second electrolytic bath, and a diaphragm provided between the first electrolytic bath and the second electrolytic bath, and configured to reduce the nitrogen by the ammonia producing catalyst and the reducing agent in the second electrolytic bath to produce ammonia, and reduce the reducing agent oxidized due to the production of the ammonia, at the reduction electrode by connecting the oxidation electrode and the reduction electrode to a power supply; a nitrogen supply unit including a nitrogen supply part for dissolving nitrogen in the second electrolytic solution and configured to sustain a reduction reaction of the nitrogen in the second electrolytic bath; and an ammonia separation unit including a separation part configured to separate the ammonia from the second electrolytic solution containing the ammonia.

Hereinafter, an ammonia manufacturing apparatus and an ammonia manufacturing method of embodiments will be explained with reference to the drawings. In the embodiments explained below, substantially the same components are denoted by the same reference signs and an explanation thereof may be partly omitted. The drawings are schematic, and a relation between the thickness and the planar dimension, a thickness ratio among the components, and so on may be different from actual ones.

Figure 1:
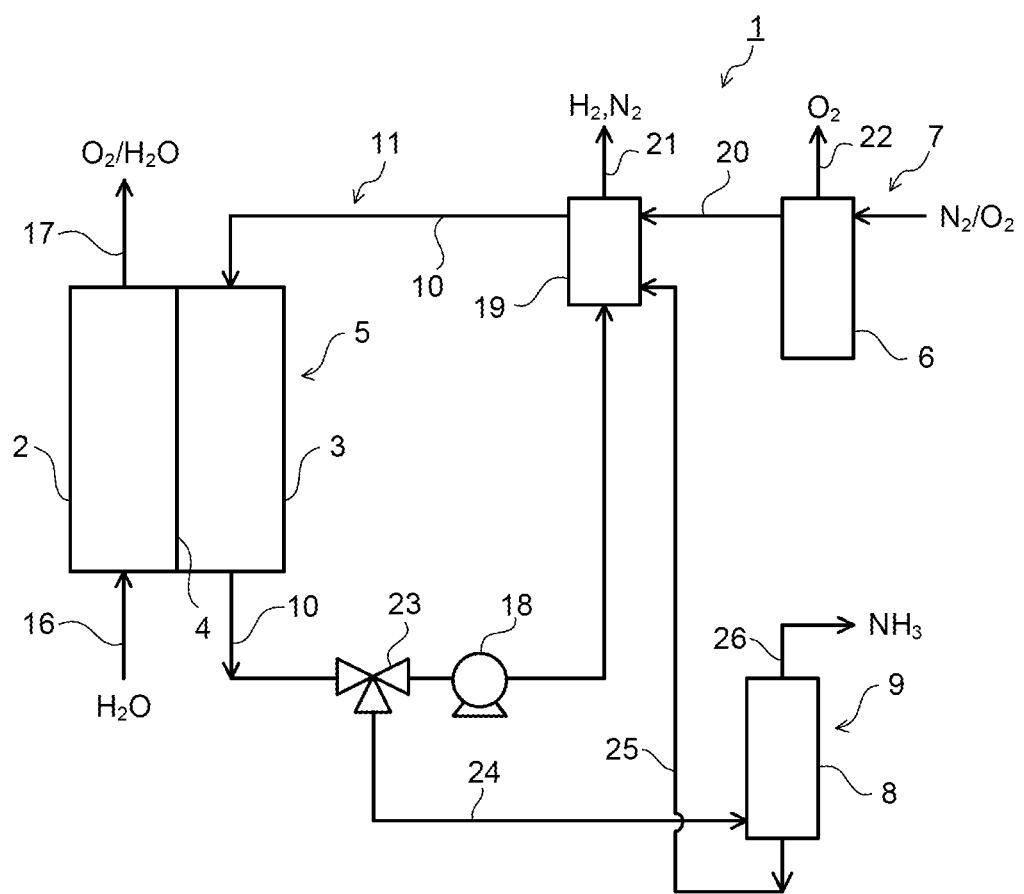
FIG. 1 is a view illustrating an ammonia manufacturing apparatus of an embodiment.

FIG. 1 is a view illustrating an ammonia manufacturing apparatus 1 of an embodiment. The ammonia manufacturing apparatus 1 illustrated in FIG. 1 includes: an electrochemical reaction unit 5 including a first electrolytic bath (oxidation reaction electrolytic bath) 2 for accommodating a first electrolytic solution, a second electrolytic bath (reduction reaction electrolytic bath) 3 for accommodating a second electrolytic solution containing nitrogen ($N_2$), an ammonia producing catalyst, and a reducing agent, and a diaphragm 4; a nitrogen supply unit 7 including a nitrogen supply part (supplier) 6 for dissolving nitrogen in the second electrolytic solution; and an ammonia separation unit 9 including an ammonia separation part (separator) 8 for separating ammonia from the second electrolytic solution. The ammonia manufacturing apparatus 1 further includes an electrolytic solution circulation unit 11 including a circulation pipe 10 for circulating the second electrolytic solution accommodated in the second electrolytic bath 3, outside the second electrolytic bath 3. Hereinafter, each component will be explained in detail.

Figure 2:
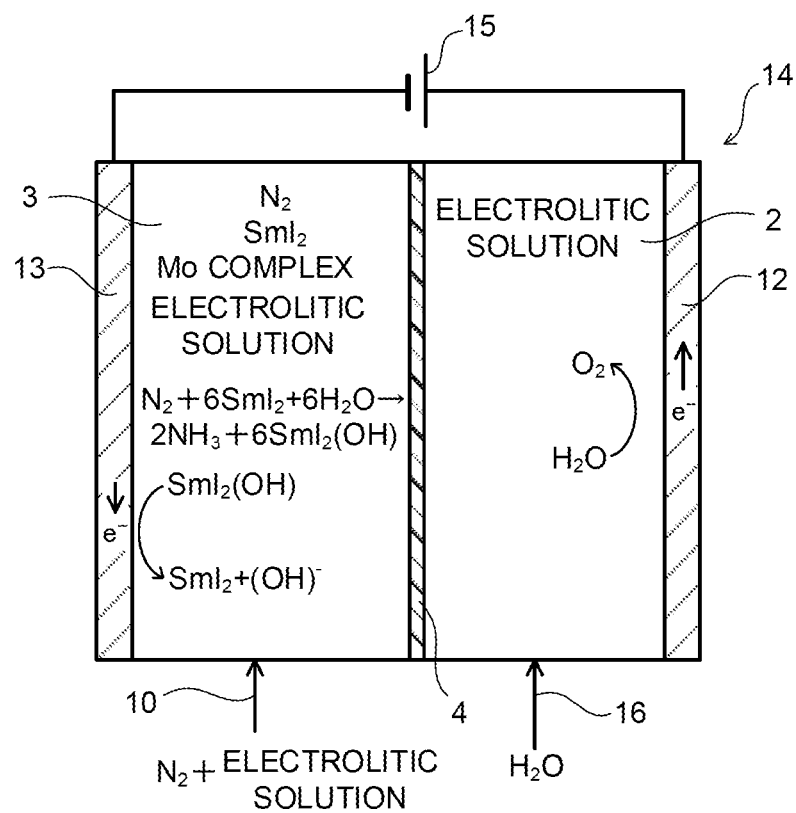
FIG. 2 is a view illustrating a first example of an electrochemical reaction unit of the ammonia manufacturing apparatus illustrated in FIG. 1.
Figure 3:
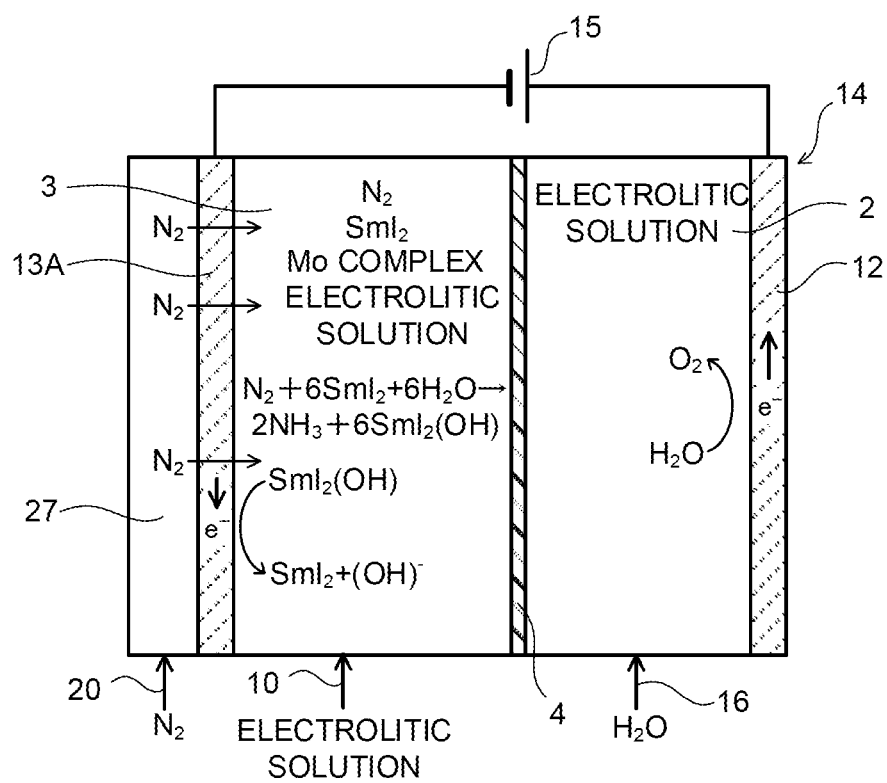
FIG. 3 is a view illustrating a second example of the electrochemical reaction unit of the ammonia manufacturing apparatus illustrated in FIG. 1.

The electrochemical reaction unit 5 includes, as illustrated in FIG. 2, the first electrolytic bath (oxidation reaction electrolytic bath) 2, the second electrolytic bath (reduction reaction electrolytic bath) 3, the diaphragm 4, an oxidation electrode 12 disposed in the first electrolytic bath 2 and used for an electrochemical oxidation reaction, and a reduction electrode 13 disposed in the second electrolytic bath 3 and used for an electrochemical reduction reaction, and these constitute an electrochemical reaction cell 14. The electrochemical reaction cell 14 is partitioned into the first electrolytic bath 2 and the second electrolytic bath 3 by the diaphragm 4 capable of moving ions such as hydrogen ions ($H^+$) and hydroxide ions ($OH^-$). For example, water is supplied as the first electrolytic solution via a pipe 16 into the first electrolytic bath 2. The second electrolytic solution containing nitrogen ($N_2$) is supplied via the circulation pipe 10 into the second electrolytic bath 3 in which the ammonia producing catalyst and the reducing agent are accommodated.

The oxidation electrode 12 and the reduction electrode 13 are connected to an external electrode 15. By supplying electric power from the external electrode 15 to the oxidation electrode 12 and the reduction electrode 13, an oxidation reaction occurs at the oxidation electrode 12 and a reduction reaction occurs at the reduction electrode 13. In the first electrolytic bath 2, for example, water ($H_2O$) as the first electrolytic solution is oxidized at the oxidation electrode 12 to produce oxygen ($O_2$) and hydrogen ions ($H^+$) and electrons ($e^-$). The produced oxygen is discharged together with water from the first electrolytic bath 2 via a pipe 17. In the second electrolytic bath 3, nitrogen ($N_2$) in the second electrolytic solution is reduced by the ammonia producing catalyst and the reducing agent to produce ammonia ($NH_3$). The second electrolytic solution containing ammonia is derived to the outside of the second electrolytic bath 3 via the circulation pipe 10, and at least part thereof is sent intermittently or continuously to the ammonia separation unit 9. The reducing agent is oxidized by the production of ammonia, and the oxidized reducing agent is reduced at the reduction electrode 13 and is thereby reproduced. Concrete reaction formulas and reaction materials will be explained later.

As the first electrolytic solution, water ($H_2O$) is used as explained above. The first electrolytic solution may be an aqueous solution containing an electrolyte or the like. The second electrolytic solution preferably has high ion conductivity and has an electrolyte itself being unreactive. Examples of the electrolyte contained in the second electrolytic solution include lithium hydroxide (LiOH), sodium hydroxide (NaOH), potassium hydroxide (KOH), lithium chloride (LiCl), sodium chloride (NaCl), potassium chloride (KCl), lithium bromide (LiBr), sodium bromide (NaBr), potassium bromide (KBr), lithium iodide (LiI), sodium iodide (NaI), potassium iodide (KI), lithium sulfate ($Li_2SO_4$), sodium sulfate ($Na_2SO_4$), potassium sulfate ($K_2SO_4$), lithium hydrogensulfate ($LiHSO_4$), sodium hydrogensulfate ($NaHSO_4$), potassium hydrogensulfate ($KHSO_4$), lithium phosphate ($Li_3PO_4$), sodium phosphate ($Na_3PO_4$), potassium phosphate ($K_3PO_4$), lithium hydrogenphosphate ($Li_2HPO_4$), sodium hydrogenphosphate ($Na_2HPO_4$), potassium hydrogenphosphate ($K_2HPO_4$), lithium dihydrogenphosphate ($LiH_2PO_4$), sodium dihydrogenphosphate ($NaH_2PO_4$), potassium dihydrogenphosphate ($KH_2PO_4$), tetraethylammonium perchlorate, tetraethylammonium tetrafluoroborate, tetraethylammonium hexafluorophosphate, tetrabutylammonium perchlorate, tetrabutylammonium tetrafluoroborate, tetrabutylammonium hexafluorophosphate, and so on. It is preferable to use water as a solvent. The electrolyte concentration in the second electrolytic solution is preferably, for example, in a range of 0.01 to 1 mol/L. This also applies to the first electrolytic solution.

The second electrolytic solution may be an aqueous solution containing an organic compound. Examples of the organic compound contained in the second electrolytic solution include methanol, ethanol, 1-propanol, 2-propanol, ethylene glycol, tetrahydrofuran, acetonitrile, ethylene carbonate, propylenecarbonate, dimethylformamide, dimethyl sulfoxide, ionic liquid and so on.

As a cation in the ionic liquid, ions such as an imidazolium ion and a pyridinium ion are used. Examples of the imidazolium ion include a 1-ethyl-3-methyl imidazolium ion, a 1-methyl-3-propylimidazolium ion, a 1-butyl-3-methylimidazole ion, a 1-methyl-3-pentylimidazolium ion, a 1-hexyl-3-methylimidazolium ion, and so on. The 2-positions of these imidazolium ions may be substituted, and examples thereof include a 1-ethyl-2,3-dimethyl imidazolium ion, a 1,2-dimethyl-3-propylimidazolium ion, a 1-butyl-2,3-dimethylimidazolium ion, a 1,2-dimethyl-3-pentylimidazolium ion, a 1-hexyl-2,3-dimethylimidazolium ion, and so on. Examples of the pyridinium ion include methylpyridinium, ethylpyridinium, propylpyridinium, butylpyridinium, pentylpyridinium, hexylpyridinium and so on. In both of the imidazolium ion and the pyridinium ion, the alkyl group may be substituted and an unsaturated bond may exist.

Example of an anion in the ionic liquid include a fluoride ion, a chloride ion, a bromide ion, an iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide and so on. Further, it is possible to use a dipolar ion made by coupling the cation and the anion in the ionic liquid by hydrocarbon. The electrolyte concentration in the second electrolytic solution is preferably, for example, in a range of 0.01 to 5 mol/L. This also applies to the first electrolytic solution.

The oxidation electrode 12 is disposed in the first electrolytic bath 2 into which the first electrolytic solution is further supplied. At the oxidation electrode 12, $H_2O$ is oxidized to produce $O_2$ and $H^+$ when the hydrogen ion concentration in the first electrolytic solution is 7 or less (pH≤7). On the other hand, when the hydrogen ion concentration in the first electrolytic solution is larger than 7 (pH>7), $OH^-$ is oxidized to produce $O_2$ and $H_2O$. Therefore, the oxidation electrode 12 is composed of a material which decreases the activation energy for causing an oxidation reaction. In other words, the oxidation electrode 12 is composed of a material which decreases the overvoltage when causing a reaction of oxidizing $H_2O$ or $OH^-$ to draw electrons. Examples of the constituting material of the oxidation electrode 12 include binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O) and so on, ternary metal oxides such as Ni—Co—O, La—Co—O, Ni—La—O, Sr—Fe—O and so on, quaternary metal oxides such as Pb—Ru—Ir—O, La—Sr—Co—O and so on, and a metal complex such as a Ru complex or an Fe complex. Further, examples of the constituting material include carbon materials such as graphene, carbon nanotube (CNT), fullerene, ketjen black, glasslike carbon and so on.

The reduction electrode 13 is used for reproducing the reducing agent consumed due to production of ammonia, by an electrochemical reduction reaction. For implementing the reduction reaction, the reduction electrode 13 is composed of an electrode material having conductivity. Examples of the constituting the reduction electrode 13 include a metal selected from a group consisting of gold (Au), silver (Ag), copper (Cu), platinum (Pt), zinc (Zn), iron (Fe), titanium (Ti), tin (Sn), indium (In), bismuth (Bi), samarium (Sm), and nickel (Ni), a metal material such as an alloy containing at least one of the metals, and carbon materials such as graphene, carbon nanotube (CNT), fullerene, ketjen black, glasslike carbon and so on.

For the diaphragm 4, a membrane capable of selectively allowing the anion or the cation to flow is used. As the diaphragm 4, for example, an ion exchange membrane such as NEOSEPTA (registered trademark) of ASTOM Corporation, Selemion (registered trademark) and Aciplex (registered trademark) of ASAHI GLASS Inc., Fumasep (registered trademark) and fumapem (registered trademark) of Fumatech GmbH, Nafion (registered trademark) being fluorocarbon resin made by sulfonating and polymerizing tetrafluoroethylene of DuPont Inc., lewabrane (registered trademark) of LANXESS Co. Ltd., IONSEP (registered trademark) of ION IECH Inc., Mustang (registered trademark) of PALL Corp., ralex (registered trademark) of mega Corp., Gore-Tex (registered trademark) of Gore-Tex Inc. or the like can be used.

For the diaphragm 4, for example, porous membranes of a silicone resin, fluorine-based resins such as perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylenechlorotrifluoroethylene copolymer (ECTFE), and porous membranes of ceramics, filling of a glass filter or agar, insulating porous bodies such as zeolite, oxide, and the like, other than the ion exchange membrane, can be used. A hydrophilic porous membrane never causes clogging due to air bubbles and is preferably used as the diaphragm 4.

The electrolytic solution circulation unit 11 is a unit which takes the second electrolytic solution containing the produced ammonia out of the second electrolytic bath 3 to the outside and circulates the second electrolytic solution containing nitrogen ($N_2$) in the circulation pipe 10 so as to supply the second electrolytic solution to the second electrolytic bath 3. The circulation pipe 10 is provided with a liquid feed pump 18 for circulating the second electrolytic solution and an electrolytic solution regulation tank 19 which stores the second electrolytic solution and regulates the nitrogen concentration. The electrolytic solution circulation unit 11 is configured to circulate the second electrolytic solution by the liquid feed pump 18 between the second electrolytic bath 3 and the electrolytic solution regulation tank 19.

Though the liquid feed pump 18 is provided in the circulation pipe 10 which sends the second electrolytic solution from the electrolytic solution regulation tank 19 to the second electrolytic bath 3 in FIG. 1, the liquid feed pump 18 may be provided in the circulation pipe 10 which sends the second electrolytic solution from the second electrolytic bath 3 to the electrolytic solution regulation tank 19. The electrolytic solution regulation tank 19 is connected with a pipe 20 into which nitrogen is supplied from the nitrogen supply unit 7. The electrolytic solution circulation unit 11 preferably includes an exhaust unit 21 which exhausts excessive nitrogen which has not dissolved in the second electrolytic solution and gas which has been generated by the reduction reaction. As the exhaust unit 21, for example, a pipe provided with a valve is used and provided, for example, in the electrolytic solution regulation tank 19.

The nitrogen supply unit 7 is a unit which supplies nitrogen to the second electrolytic solution to be supplied to the second electrolytic bath 3, and includes the nitrogen supplier 6. As the nitrogen to be supplied from the nitrogen supplier 6, for example, the nitrogen in the air is used, but not limited to this. Since about 21% of oxygen is contained in the air, it is preferable to separate oxygen in advance and then take out nitrogen. In the case of using nitrogen in the air, an oxygen separator which separates oxygen in the air and then takes out nitrogen is used for the nitrogen supplier 6. As a separation method of oxygen in the air in the oxygen separator, for example, the low-temperature separation method of separating oxygen by utilizing the difference in boiling point, the adsorption separation method utilizing the difference in adsorbing characteristics with respect to gas molecules of a zeolite adsorbent, the membrane separation method of separating oxygen by utilizing that the speed of permeating the membrane differs depending on the gas molecule, or the like is used and can be appropriately selected according to the cost and apparatus scale, but not particularly limited.

The nitrogen supply unit 7 has a pipe 20 which supplies the nitrogen ($N_2$) taken out by the oxygen separator to the second electrolytic solution stored in the electrolytic solution regulation tank 19 to make the nitrogen dissolve in the second electrolytic solution. Further, the oxygen separator has a pipe 22 which exhausts the separated oxygen. Here, the nitrogen ($N_2$) taken out by the oxygen separator is supplied to the second electrolytic solution stored in the electrolytic solution regulation tank 19, but the supply of the nitrogen is not limited to the electrolytic solution regulation tank 19 but may be performed to any part in the second electrolytic bath 3 and the circulation pipe 10, and the nitrogen may be directly sprayed into the second electrolytic solution in the second electrolytic bath 3 as will be further explained later.

The ammonia separation unit 9 is a unit which recovers ammonia ($NH_3$) that is a reduced substance of nitrogen from the second electrolytic solution. The ammonia separation unit 9 includes the separation part (separator) 8 which separates ammonia from the second electrolytic solution, a three-way valve 23 which takes out at least part of the second electrolytic solution circulating in the circulation pipe 10, a pip 24 which sends the second electrolytic solution taken out of the three-way valve 23 to the ammonia separator 8, and a pipe 25 which sends the second electrolytic solution from which ammonia has been separated in the ammonia separator 8 to the electrolytic solution regulation tank 19. The three-way valve 23 is provided in the circulation pipe 10, and the ammonia separation unit 9 is connected to the electrolytic solution circulation unit 11 via the three-way valve 23. The taking-out of the second electrolytic solution circulating in the circulation pipe 10 may be implemented not by using the three-way valve 23 provided in the circulation pipe 10 but by connecting a pipe having a valve to the electrolytic solution regulation tank 19 and its configuration is not particularly limited.

As a method of separating ammonia from the second electrolytic solution in the ammonia separator 8, for example, the distillation method of separating ammonia by utilizing the difference in boiling point, the adsorption separation method utilizing the difference in adsorbing characteristics with respect to gas molecules of a zeolite adsorbent, the membrane separation method of separating ammonia by utilizing the fact that the speed of permeating the membrane differs depending on the gas molecule, or the like is used and can be appropriately selected according to the cost and apparatus scale, but not particularly limited. The ammonia separator 8 is provided with a pipe 26 which recovers ammonia separated from the second electrolytic solution.

In the case of separating ammonia from the second electrolytic solution by distillation, a distillation column is used as the ammonia separator 8. The distillation column is configured to separate ammonia having a boiling point lower than that of water used as part of the second electrolytic solution. In the distillation column, ammonia is separated by distillation by the conventional method from the second electrolytic solution supplied via the three-way valve 23. Specifically, ammonia is discharged from a pipe 26 at a column top part of the distillation column by subjecting the second electrolytic solution to reduced-pressure distillation under a reduced pressure of 10 to 120 Torr (1333 to 15999 Pa). The ammonia discharged from the pipe 26 is recovered into a not-illustrated tank or the like. When the second electrolytic solution contains an organic component, it is preferable to further separate the organic component by utilizing the difference in boiling point from that of ammonia.

For the separation of ammonia, the stripping method of bringing the second electrolytic solution into contact with vapor and moving the ammonia in the second electrolytic solution to the vapor to recover ammonia may be used. In this case, the ammonia separator 8 includes a stripping column whose inside is partitioned by a porous plate, and flows the second electrolytic solution supplied from the circulation pipe 10 via the three-way valve 23 from the upper tier to the lower tier of the stripping column. The vapor flows from the lower tier to the upper tier and rises in the liquid dammed by the porous plate. Due to the contact of the second electrolytic solution with the vapor, the ammonia in the second electrolytic solution vaporizes and moves into the vapor and is thereby discharged from the pipe 26 at the column top part.

Next, the ammonia manufacturing process using the above ammonia manufacturing apparatus 1 will be explained. First, as an initial stage, the first electrolytic solution is supplied into the first electrolytic bath 2 via the pipe 16, and the second electrolytic solution in which nitrogen ($N_2$) is supplied from the nitrogen supplier 6 and dissolved therein in the electrolytic solution regulation tank 19 is supplied into the second electrolytic bath 3 via the circulation pipe 10. Into the second electrolytic bath 3, the ammonia producing catalyst and the reducing agent are supplied using the not-illustrated supplier together with the second electrolytic solution. The ammonia producing catalyst and the reducing agent may be artificially supplied into the second electrolytic bath 3. In this state, electric power is supplied from the external electrode 15 to the oxidation electrode 12 and the reduction electrode 13.

The external power supply 15 may be an ordinary commercial power supply, a battery or the like, or a power supply which converts renewable energy to electric energy and supplies it. Examples of the power supply include a power supply that converts kinetic energy or potential energy such as wind power, water power, geothermal power, tidal power or the like into electric energy, a power supply such as a solar cell having a photoelectric conversion element that converts light energy into electric energy, a power supply such as a fuel cell or a storage battery that converts chemical energy into electric energy, an apparatus that converts vibrational energy such as sound into electric energy, and so on. The photoelectric conversion element has a function of performing charge separation by energy of emitted light such as sunlight. Examples of the photoelectric conversion element include a pin junction solar cell, a pn-junction solar cell, an amorphous silicon solar cell, a multijunction solar cell, a single-crystal silicon solar cell, a polycrystalline silicon solar cell, a dye-sensitized solar cell, an organic thin-film solar cell, and the like.

By supplying electric power from the external electrode 15 to the oxidation electrode 12 and the reduction electrode 13, an oxidation reaction of water ($H_2O$) or hydroxide ions ($OH^-$) in the first electrolytic solution electrochemically occurs at the oxidation electrode 12. For example, when the hydrogen ion concentration in the first electrolytic solution is 7 or less ($pH \leq 7$), $H_2O$ is oxidized to produce $O_2$ and $H^+$ based on the following Formula (1). When the hydrogen ion concentration in the first electrolytic solution is larger than 7 ($pH > 7$), $OH^-$ is oxidized to produce $O_2$ and $H_2$ based on the following Formula (2).

$$3H_2O \rightarrow 3/2O_2 + 6H^+ + 6e^- \quad (1)$$

$$6OH^- \rightarrow 3/2O_2 + 3H_2O + 6e^- \quad (2)$$

In the second electrolytic bath 3, nitrogen ($N_2$) in the second electrolytic solution is reduced by the ammonia producing catalyst and the reducing agent, separately from the electrochemical reaction, to produce ammonia ($NH_3$). Here, a halide (II) of a lanthanoide metal is used, for example, as the reducing agent. Examples of lanthanoide metal include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu), and Sm of them is preferable. Examples of halogen include chlorine (Cl), bromine (Br), and iodine (I), and iodine of them is preferable. As the halide (II) of the lanthanoide metal, samarium (II) iodide ($SmI_2$) is more preferable. The ammonia producing catalyst will be explained later in detail. In the case of using, for example, $SmI_2$ as the reducing agent, $N_2$ in the second electrolytic solution is reduced to produce ammonia ($NH_3$) based on the following Formula (3).

$$N_2 + 6SmI_2 + 6H_2O \rightarrow 2NH_3 + 6SmI_2(OH) \quad (3)$$

As expressed in the above Formula (3), $SmI_2$ as the reducing agent is oxidized due to the production of $NH_3$, and the function as the reducing agent is degraded in this state. In other words, when the reduction reaction of $N_2$ in the second electrolytic solution is caused in the second electrolytic bath not having the reduction electrode 13 which electrochemically causes the reduction reaction, the reduction reaction of $N_2$ stops and the production of $NH_3$ is ended at a point in time when the reducing agent in the amount supplied into the second electrolytic bath in the initial state is consumed due to the reduction reaction of $N_2$. Regarding this point, the reduction electrode 13 causing the electrochemical reduction reaction is disposed in the second electrolytic bath 3 in the ammonia manufacturing apparatus 1 of the embodiment, so that the reducing agent oxidized at the reduction electrode 13, namely, $SmI_2(OH)$ can be reduced and thereby reproduced based on the following Formula (4). Accordingly, the reduction reaction of $N_2$ can be continuously sustained. The amount of use of the reducing agent is preferably set to 0.01 to 2 mol/L and more preferably 0.1 to 1 mol/L with respect to the second electrolytic solution in order to accelerate the reaction with the ammonia producing catalyst.

$$6SmI_2(OH) + 6e^- \rightarrow 6SmI_2 + 6OH^- \quad (4)$$

The second electrolytic solution containing $NH_3$ produced by the above reduction of $N_2$ is sent to the electrolytic solution regulation tank 19 via the circulation pipe 10, and further supplied with nitrogen in the electrolytic solution regulation tank 19 and sent again to the second electrolytic bath 3. In other words, the second electrolytic solution is circulated in the circulation pipe 10 so as to sustain the reduction reaction of $N_2$ and the reduction reaction of the oxidized reducing agent in the second electrolytic bath 3 and the supply of $N_2$ by the electrolytic solution regulation tank 19. By circulating the second electrolytic solution in the circulation pipe 10 while continuing the production of $NH_3$ and the supply of $N_2$, the ammonia concentration in the second electrolytic solution increases. By sending at least part of the second electrolytic solution increased in ammonia concentration to the ammonia separator 8 via the three-way valve 23, ammonia is separated from the second electrolytic solution.

The supply of the second electrolytic solution containing ammonia to the ammonia separator 8 may be performed continuously from the start of operation of the apparatus, and is preferably intermittently performed at the point in time when the concentration of ammonia contained in the second electrolytic solution becomes high enough. In other words, when the concentration of ammonia contained in the second electrolytic solution is low, the energy to be input to recover ammonia from the second electrolytic solution becomes larger than the energy amount stored in ammonia, and thereby may increase the manufacturing cost of ammonia and lose profitability. Regarding this point, the second electrolytic solution is circulated through the circulation pipe 10 via the second electrolytic bath 3 and the electrolytic solution regulation tank 19, so that the second electrolytic solution containing ammonia at high concentration can be obtained. It is preferable to send the second electrolytic solution containing ammonia at high concentration to the ammonia separator 8. This makes it possible to recover ammonia being a reduction product of $N_2$ with high efficiency. In order to improve the recovery efficiency of ammonia, it is preferable to send the second electrolytic solution containing ammonia at a concentration of 0.01 to 50 mass % to the ammonia separator 8.

In the ammonia manufacturing apparatus 1 of the embodiment, the second electrolytic solution containing ammonia being a reduction product of $N_2$ is circulated between the second electrolytic bath 3 and the electrolytic solution regulation tank 19. In the circulation path of the second electrolytic solution, nitrogen being a reduction material is intermittently resupplied to the second electrolytic solution. Further, the reducing agent oxidized due to the production of ammonia in the second electrolytic bath 3 is electrochemically reduced at the reduction electrode 13 and thereby reproduced. These sustain the reduction reaction of nitrogen in the second electrolytic bath 3 for reduction reaction, thus enabling an increase in concentration of ammonia being a reduction product contained in the second electrolytic solution. Note that the produced reduced substance is not involved in the electrochemical reduction reaction in the second electrolytic bath 3, so that the reduction reaction of nitrogen can be sustained regardless of the concentration of the reduced substance in the second electrolytic solution.

The ammonia producing catalyst to be supplied into the second electrolytic bath 3 is for accelerating the production of ammonia from nitrogen under the presence of the reducing agent and, for example, a molybdenum complex is used but not limited to this. Examples pf the ammonia producing catalyst include molybdenum complexes in the following (A) to (D).

A first example includes (A) a molybdenum complex having N,N-bis(dialkylphosphinomethyl)dihydrobenzimidazolidene (where two alkyl groups may be the same or different and at least one hydrogen atom of the benzene ring may be substituted with an alkyl group, an alkoxy group, or a halogen atom) as a PCP ligand.

A second example includes (B) a molybdenum complex having 2,6-bis(dialkylphosphinomethyl)pyridine (where two alkyl groups may be the same or different and at least one hydrogen atom of the pyridine ring may be substituted with an alkyl group, an alkoxy group, or a halogen atom) as a PNP ligand.

A third example includes (C) a molybdenum complex having bis(dialkylphosphinomethyl)arylphosphine (where two alkyl groups may be the same or different) as a PPP ligand.

A fourth example includes (D) a molybdenum complex expressed by trans-$Mo(N_2)_2(R1R2R3P)_4$ (where R1, R2, R3 are alkyl groups or aryl groups which may be the same or different, and two R3s may couple with each other to form an alkylene chain).

In the above molybdenum complexes, the alkyl group may be, for example, a methyl group, an ethyl group, a propyl group, a butyl group, a pentyl group, a hexyl group, and a straight-chain or branched-chain alkyl group of their structural isomers, or a cyclic alkyl group such as a cyclopropyl group, a cyclobutyl group, a cyclopentyl group, or a cyclohexyl group. The carbon number of the alkyl group is preferably 1 to 12, and more preferably 1 to 6. The alkoxy group may be, for example, a methoxy group, an ethoxy group, a propoxy group, a butoxy group, a pentoxy group, a hexyloxy, and a straight-chain or branched-chain alkoxy group of their structural isomers, or a cyclic alkoxy group such as a cyclopropoxy group, a cyclobutoxy group, a cyclopentoxy group, or a cyclohexyloxy group. The carbon number of the alkoxy group is preferably 1 to 12, and more preferably 1 to 6. Examples of the halogen atom include a fluorine atom, a chlorine atom, a bromine atom, an iodine atom and so on.

The molybdenum complex of (A) includes a molybdenum complex expressed, for example, by the following Formula (A1).

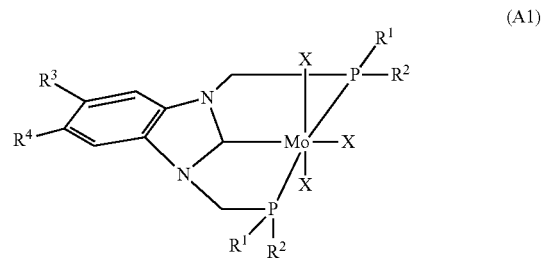

(A1)

Here, R1 and R2 are alkyl groups which may be the same or different, and X is an iodine atom, a bromine atom, or a chlorine atom, and at least one hydrogen atom on the benzene ring may be substituted with an alkyl group, an alkoxy group, or a halogen atom.

Examples of the alkyl group, the alkoxy group, and the halogen atom include the same as those already exemplified. R1 and R2 are each preferably a bulky alkyl group (for example, a tert-butyl group or an isopropyl group). It is preferable that the hydrogen atom on the benzene ring is not substituted, or the 5-position or 6-position hydrogen atom is substituted with a 1-12C chain, cyclic, or branched alkyl group.

Examples of the molybdenum complex of (B) include molybdenum complexes expressed, for example, by the following Formula (B1), Formula (B2), and Formula (B3).

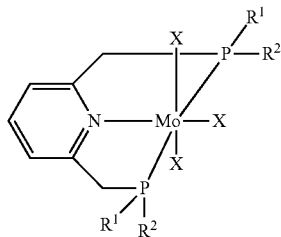
(B1)

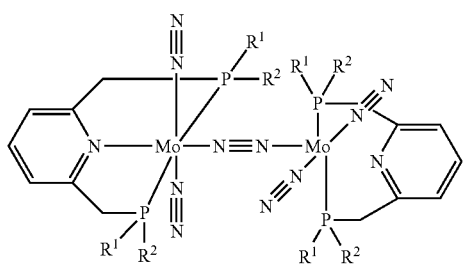
(B2)

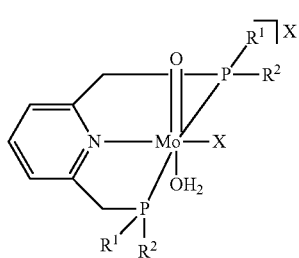
(B3)

Here, R1 and R2 are alkyl groups which may be the same or different, and X is an iodine atom, a bromine atom, or a chlorine atom, and at least one hydrogen atom on the pyridine ring may be substituted with an alkyl group, an alkoxy group, or a halogen atom.

Examples of the alkyl group, the alkoxy group, and the halogen atom include the same as those already exemplified. R1 and R2 are each preferably a bulky alkyl group (for example, a tert-butyl group or an isopropyl group). It is preferable that the hydrogen atom on the pyridine ring is not substituted, or the 4-position hydrogen atom is substituted with a 1-12C chain, cyclic, or branched alkyl group.

The molybdenum complex of (C) includes a molybdenum complex expressed, for example, by the following Formula (C1).

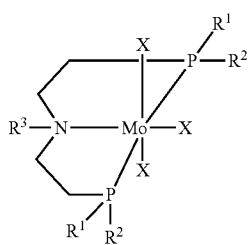
(C1)

Here, R1 and R2 are alkyl groups which may be the same or different, R3 is an aryl group, and X is an iodine atom, a bromine atom, or a chlorine atom.

Examples of the alkyl group include the same as those already exemplified. Examples of the aryl group include a phenyl group, a tolyl group, a xylyl group, a naphthyl group, and those each having at least one of cyclic hydrogen atoms substituted with an alkyl group or a halogen atom. Examples of the alkyl group and the halogen atom include the same as those already exemplified. R1 and R2 are each preferably a bulky alkyl group (for example, a tert-butyl group or an isopropyl group). R3 is preferably, for example, a phenyl group.

Examples of the molybdenum complex of (D) include molybdenum complexes expressed, for example, by the following Formula (D1) and Formula (D2).

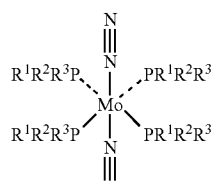
(D1)

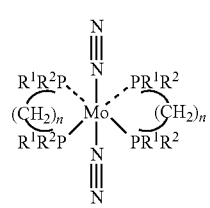
(D2)

Here, R1 and R2 are alkyl groups or aryl groups which may be the same or different, and n is 2 or 3.

Examples of the alkyl group and the aryl group include the same as those already exemplified. In Formula (D1), it is preferable that R1 and R2 are aryl groups (for example, phenyl groups) and R3 is a 1-4C alkyl group (for example, a methyl group) or that R1 and R2 are 1-4C alkyl groups (for example, methyl groups) and R3 is an aryl group (for example, a phenyl group). In Formula (D2), it is preferable that R1 and R2 are aryl groups (for example, phenyl groups) and n is 2.

The amount of use of the ammonia producing catalyst in the second electrolytic bath 3 of the electrochemical reaction cell 14 only needs to be selected in a range of 0.00001 to 0.1 mol/L equivalent, preferably 0.0001 to 0.05 mol/L equivalent, and more preferably 0.0005 to 0.01 mol/L equivalent to the second electrolytic solution.

Next, an additional configuration example and variation example of the ammonia manufacturing apparatus 1 of the embodiment will be explained. The first and second electrolytic baths 2, 3 may be provided with circulation mechanisms such as pumps. By promoting the circulation of the electrolytic solution by the circulation mechanisms, the circulation of ions ($H^+$ and $OH^-$) between the first electrolytic bath 2 for oxidation reaction and the second electrolytic bath 3 for reduction reaction can be improved. Besides, the first and second electrolytic baths 2, 3 may be provided with flow paths and may be provided with a plurality of circulation mechanisms. Further, to reduce the diffusion of ions to more efficiently circulate the ions, a plurality of (three or more) electrolytic bath flow paths may be provided. Creating the flow of liquid by the circulation mechanisms makes it possible to suppress the stay of generated bubbles on the electrode surfaces and the surfaces of the electrolytic baths to accelerate the reactions.

The first and second electrolytic baths 2, 3 may be provided with temperature regulating mechanisms which regulate the temperatures of the electrolytic solutions. By controlling the temperatures using the temperature regulating mechanisms, it is possible to control catalytic performances. For example, by making the temperature of a reaction system uniform, the performances of the catalysts can be stabilized. Further, a temperature increase can also be prevented for system stabilization. The reaction temperature in the electrochemical reaction cell 14 can be appropriately selected in a range of 5 to 80 degrees in consideration of the electrolytic solution being an aqueous solution, the reaction efficiency, and the economic efficiency. Preferably, the reaction temperature may be near room temperature (10 to 40 degrees).

Figure 4:
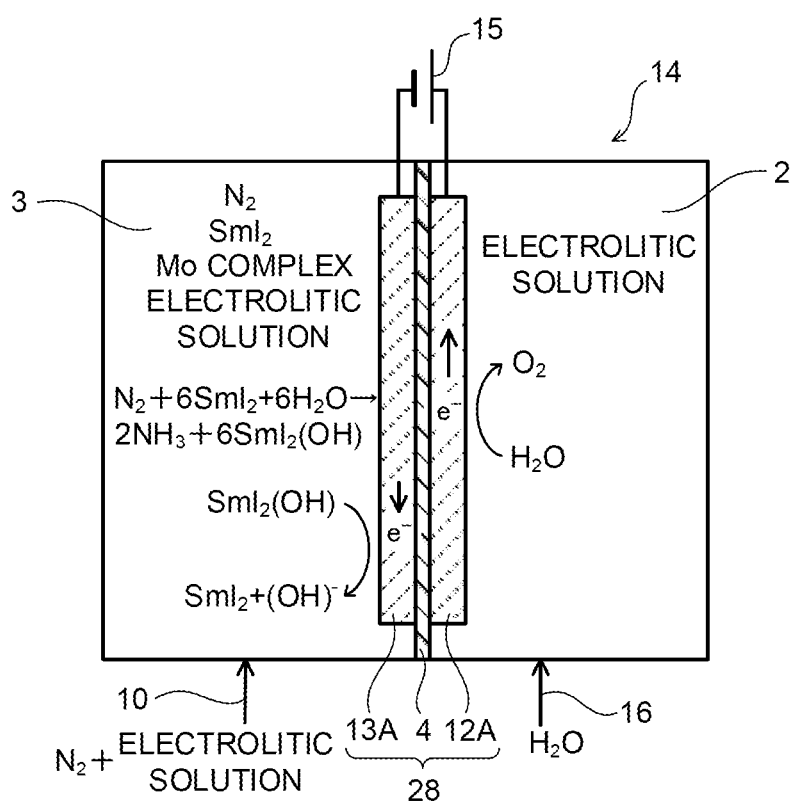
FIG. 4 is a view illustrating a third example of the electrochemical reaction unit of the ammonia manufacturing apparatus illustrated in FIG. 1.

The electrochemical reaction cell 14 may have the oxidation electrode 12, a porous reduction electrode 13A, and the diaphragm 4. By making the porous reduction electrode 13A porous, it is possible to increase the reaction area and obtain more reaction current. Nitrogen can be supplied from the surface of the porous reduction electrode 13A, opposite to the surface in contact with the ammonia producing catalyst, the reducing agent, and the electrolytic solution containing nitrogen. More specifically, the electrochemical reaction cell 14 illustrated in FIG. 4 has the porous reduction electrode 13A, and a nitrogen supply pipe 27 which supplies nitrogen to the second electrolytic solution via the porous reduction electrode 13A. A path through which nitrogen passes may be provided with a flow path. By providing a plurality (three or more) gas flow paths, it is possible to uniformly distribute and flow nitrogen to the porous reduction electrode 13A.

The electrochemical reaction cell 14 may have an electrode structure 28 having the diaphragm 4 sandwiched between a porous oxidation electrode 12A and the porous reduction electrode 13A. The porous oxidation electrode 12A and the porous reduction electrode 13A are arranged in contact with both surfaces of the diaphragm 4, respectively. The first electrolytic solution is supplied to the surface of the porous oxidation electrode 12A, opposite to the surface in contact with the diaphragm 4. The ammonia producing catalyst, the reducing agent, and the second electrolytic solution containing nitrogen are supplied to the surface of the porous reduction electrode 13A, opposite to the surface in contact with the diaphragm 4. As explained above, the structure of the electrochemical reaction cell 14 can be variously deformed.

Note that the configurations of the above-explained embodiments are applicable in combination. Further, parts thereof are replaceable. While certain embodiments of the present invention have been described above, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ammonia manufacturing method comprising:
supplying a first electrolytic solution into a first electrolytic bath of an electrochemical reaction unit and supplying a second electrolytic solution containing nitrogen, an ammonia producing catalyst, and a reducing agent into a second electrolytic bath of the electrochemical reaction unit, the electrochemical reaction unit comprising the first electrolytic bath, an oxidation electrode disposed in the first electrolytic bath, the second electrolytic bath, a reduction electrode disposed in the second electrolytic bath, and a diaphragm provided between the first electrolytic bath and the second electrolytic bath;
reducing the nitrogen by the ammonia producing catalyst and the reducing agent in the second electrolytic bath to produce ammonia, and oxidizing the first electrolytic solution at the oxidation electrode in the first electrolytic bath and reducing the reducing agent oxidized due to the production of the ammonia in the second electrolytic bath at the reduction electrode, by supplying electric power from a power supply to the oxidation electrode and the reduction electrode;
dissolving nitrogen in the second electrolytic solution so as to sustain a reduction reaction of the nitrogen in the second electrolytic bath; and
separating the ammonia from the second electrolytic solution to produce the ammonia.

2. The method according to claim 1, wherein:
the dissolving nitrogen into the second electrolytic solution is performed so as to increase a concentration of the ammonia in the second electrolytic solution; and
the separating the ammonia is performed so as to separate the ammonia from the second electrolytic solution increased in the concentration of the ammonia.

3. The method according to claim 1, further comprising:
circulating the second electrolytic solution outside the second electrolytic bath;
supplying nitrogen to the second electrolytic solution in a circulation path of the second electrolytic solution including the second electrolytic bath; and
taking at least part of the second electrolytic solution out of the circulation path and separating the ammonia from the second electrolytic solution, and sending the second electrolytic solution from which the ammonia has been separated into the circulation path.

4. The method according to claim 3, wherein
nitrogen is supplied to the second electrolytic solution stored in an electrolytic solution regulation tank provided in the circulation path, and the second electrolytic solution from which the ammonia has been separated is sent to the electrolytic solution regulation tank.

5. The method according to claim 1, wherein
the reducing agent includes a halide of a lanthanoide metal.

6. The method according to claim 1, wherein
the ammonia producing catalyst includes a molybdenum complex.

* * * * *